(12) United States Patent
Takeda et al.

(10) Patent No.: US 8,835,553 B2
(45) Date of Patent: Sep. 16, 2014

(54) COATING COMPOSITION FOR THICK COATING

(75) Inventors: Shinji Takeda, Nagoya (JP); Masafumi Achiwa, Nagoya (JP); Hiroyuki Noguchi, Nagoya (JP); Akemi Kouketsu, Nagoya (JP); Katsunobu Mochizuki, Nagoya (JP)

(73) Assignee: Toagosei Co., Ltd., Tokyo (JP)

( * ) Notice: Subject to any disclaimer, the term of this patent is extended or adjusted under 35 U.S.C. 154(b) by 15 days.

(21) Appl. No.: 13/266,021

(22) PCT Filed: Jun. 30, 2010

(86) PCT No.: PCT/JP2010/061191
§ 371 (c)(1),
(2), (4) Date: Dec. 2, 2011

(87) PCT Pub. No.: WO2011/004753
PCT Pub. Date: Jan. 13, 2011

(65) Prior Publication Data
US 2012/0094115 A1   Apr. 19, 2012

(30) Foreign Application Priority Data
Jul. 8, 2009   (JP) .................................. 2009-162235

(51) Int. Cl.
| | | |
|---|---|---|
| C09D 133/20 | (2006.01) | |
| C09D 133/04 | (2006.01) | |
| C08K 3/30 | (2006.01) | |
| C08K 3/34 | (2006.01) | |
| C08K 3/26 | (2006.01) | |
| C08F 220/10 | (2006.01) | |
| C08F 220/42 | (2006.01) | |
| C08F 220/20 | (2006.01) | |
| C09D 7/12 | (2006.01) | |
| C09D 133/10 | (2006.01) | |
| C09D 133/06 | (2006.01) | |
| C08K 7/22 | (2006.01) | |
| C08F 220/18 | (2006.01) | |

(52) U.S. Cl.
CPC ............ *C09D 133/06* (2013.01); *C09D 7/1216* (2013.01); *C08K 7/22* (2013.01); *C09D 7/1291* (2013.01); *C09D 133/10* (2013.01); *C08F 2220/185* (2013.01)
USPC ........... 524/565; 524/560; 524/521; 524/524; 524/423; 524/451; 524/449; 524/447; 524/445; 524/435; 524/543; 428/339

(58) Field of Classification Search
USPC .......... 428/339; 524/521, 425, 423, 451, 449, 524/447, 445, 435, 543, 556, 560, 565
See application file for complete search history.

(56) References Cited

U.S. PATENT DOCUMENTS

| 3,671,476 A | 6/1972 | Terai et al. |
| 4,581,394 A | 4/1986 | Yoshida et al. |
| 5,514,435 A * | 5/1996 | Suzuki et al. ................. 428/41.5 |
| 2001/0020064 A1* | 9/2001 | Ishikawa et al. .............. 524/804 |

FOREIGN PATENT DOCUMENTS

| JP | 50 028966 | 9/1975 |
| JP | 52 101243 | 8/1977 |
| JP | 60 104598 | 6/1985 |
| JP | 06 057207 | 3/1994 |
| JP | 06 190332 | 7/1994 |
| JP | 2008 012373 | 1/2008 |
| JP | 2009 161603 | 7/2009 |

OTHER PUBLICATIONS

Handbook of Fillers, A Definiftive User's Guide and Databook, 2nd ed., Chemtech Publishing, 2000, pp. 1, 48 and 49.*
International Search Report Issued Sep. 14, 2010 in PCT/JP10/061191 Filed Jun. 30, 2010.

* cited by examiner

*Primary Examiner* — Satya Sastri
(74) *Attorney, Agent, or Firm* — Oblon, Spivak, McClelland, Maier & Neustadt, L.L.P.

(57) ABSTRACT

A coating composition has excellent application workability, facilitates thick coating, rarely causes cracks at an initial drying stage, and provides a dried film having excellent tensile properties and adhesiveness. The composition contains an aggregate and an emulsion with a polymer particle dispersed in an aqueous medium. The polymer particle includes 40% to 98% of a unit formed by polymerizing an alkyl(meth)acrylate monomer, the alkyl group having 4 to 14 carbon atoms, 0.1% to 5% of a unit formed by polymerizing an ethylenically unsaturated carboxylic acid monomer, 1% to 20% of a unit formed by polymerizing a vinyl monomer having a cyano group, 1% to 20% of a unit formed by polymerizing a reaction product of a (meth)acrylic acid and a monofunctional epoxy compound, and 0% to 50% of a unit formed by copolymerizing at least one of the above monomers with another monomer.

15 Claims, No Drawings

COATING COMPOSITION FOR THICK COATING

FIELD OF THE INVENTION

The present invention relates to a coating composition for thick coating. More specifically, the present invention relates to a coating composition for thick coating which leads to good workability during application thereof to a surface to be coated by a roller coating method, a spray coating method or the like, which suppresses the formation of a crack and the like at initial drying, and which gives a dried film having excellent tensile properties, adhesiveness to the surface to be coated.

The coating composition for thick coating of the present invention exhibiting an excellent characteristic is particularly useful in various applications which requires waterproof and framework protection at vertical surface of a wall, a pillar and the like, a horizontal surface of a roof and a floor, for an architectural and civil engineering structure, and at a basement, a water tank and tunnel.

BACKGROUND ART

When a waterproofing material or a finish-coating material, consisting of especially an acrylic resin or an acrylic rubber is used to form a coated film on a surface of an architectural and a civil structure, it has been a general practice that, as a preceding process, a primer or a sealer was applied on a surface to be coated, regardless whether a coating material has already been applied or not, so that adhesiveness to a surface to be coated, especially waterproofing adhesion, might be secured.

There has been a case that adhesiveness could be obtained by direct application of a coating material to a surface to be coated without a primer when the coating material gives a relatively hard coating with elongation of about 30% to 150% described in Patent Literature 1. However, in a waterproofing material leading to a coating with elongation of 300% or more thereby comforting with JIS A 6021 "Liquid-applied Compounds for Waterproofing Membrane Coating of Buildings", it is necessary to increase content of a resin in a coating material to some extent. Accordingly this causes problems that a coated film becomes too soft and at the same time tends to absorb water easily thereby leading to swelling, so that it is difficult to be compatible with adhesiveness.

Patent Literature 2 discloses a technology in which a coating material containing a copolymer component of an acrylate having a linear or a branched alkyl group with 6 or more carbon atoms and a polymerizable unsaturated monomer having a carbonyl group is used for a first layer to a surface to be coated so that elongation and adhesiveness under dry condition might be compatible. In this case, however, adequate waterproofing adhesion is not obtained, because a primer is coated in a test that involves a water-immersion process, such as a heating and cooling test and a freezing and thawing test.

PRIOR ART DOCUMENTS

Patent Literature

Patent Literature 1: JP-A H06-190332
Patent Literature 2: JP-A 2008-12373

DISCLOSURE OF THE INVENTION

Problems that the Invention is to Solve

The present invention is completed based on the above-mentioned description of the prior art and an object of the present invention is to provide a coating composition for thick coating which is prepared from an emulsion composition having a specified composition, which leads to good adhesiveness, particularly waterproofing adhesion, to a surface to be coated in a wide range of elongation (50% to 2,000%) of a dried film, high scratch resistance because of a tough dried film having tensile strength of 0.5 to 3.0 N/mm$^2$, high resistance to swelling caused by a vapor pressure applied from a backside of an adhesion interface, good workability during application thereof to a surface to be coated by a roller coating method, a spray coating method or the like, which suppresses the formation of a crack and the like at initial drying, and which gives a dried film having excellent tensile properties, adhesiveness with the surface to be coated.

Means for Solving the Problems

The present invention is as follows.
1. A coating composition for thick coating, characterized in that the composition comprises an aggregate and an emulsion composition in which a polymer particle is dispersed in an aqueous medium, and that the polymer particle comprises 40% to 98% by mass of (A) a structural unit formed by polymerizing an alkyl (meth)acrylate monomer having an alkyl group with 4 to 14 carbon atoms, 0.1% to 5% by mass of (B) a structural unit formed by polymerizing an ethylenically unsaturated carboxylic acid monomer, 1% to 20% by mass of (C) a structural unit formed by polymerizing a vinyl monomer having a cyano group, 1% to 20% by mass of (D) a structural unit formed by polymerizing a monomer which is a reaction product of a (meth)acrylic acid and a monofunctional epoxy compound, and 0% to 50% by mass of (E) a structural unit formed by polymerizing other monomer which is capable of copolymerizing with at least one compound among the above monomers, based on 100% by mass of the total of the structural unit (A), the structural unit (B), the structural unit (C), the structural unit (D), and the structural unit (E).
2. The coating composition for thick coating according to 1 above, wherein pigment volume concentration of the aggregate is in the range from 5% to 60%.
3. The coating composition for thick coating according to 1 or 2 above, wherein tensile strength of the dried film is in the range from 0.5 to 3.0 N/mm$^2$, and wherein elongation of the dried film is in the range from 50% to 2,000%.

Effect of the Invention

Since the coating composition of the present invention is one in which appropriate amount of an aggregate is incorporated to an emulsion composition containing polymer particles having specific structural units formed from a specific monomer composition, a thick coating can be formed on a surface to be coated by a roller coating method, a spray coating method or the like, good workability can be obtained during application, and the coating composition never causes a formation of a crack and the like at initial drying. Additionally, a dried film has excellent tensile properties and adhesiveness to a surface to be coated. A coating film is not drippy even when application is made on a slant surface or a vertical surface, and thus, the composition is particularly useful as a coating material to be applied on a wall or the like of an architectural and a civil structure.

It is to be noted that the term "coating material" includes all of a coating material, a waterproofing material, and the like, which are applied at the work site and in a factory in the field of an architectural and a civil engineering field.

In the case where pigment volume concentration of the aggregate is in the range from 5% to 60%, the coating composition for thick coating can be easily coated to a surface to be coated and at the same time the coating composition can be made to fully suppress dripping of a coating film even application is made on a slant surface or a vertical surface.

In the case where tensile strength of the dried film is in the range from 0.5 to 3.0 N/mm$^2$ and elongation thereof is in the range from 50% to 2,000%, the coating composition for thick coating is obtained which leads to a dried film with sufficient strength and flexibility and without being easily scratched for a waterproofing film or the like.

DESCRIPTION OF THE PREFERRED EMBODIMENTS

The coating composition for thick coating of the present invention (hereinafter, referred to sometimes as "coating composition") contains an aggregate and an emulsion composition in which a polymer particle is dispersed in an aqueous medium, and is characterized in that the polymer particle includes 40% to 98% by mass of (A) a structural unit formed by polymerizing an alkyl (meth)acrylate having an alkyl group with 4 to 14 carbon atoms, 0.1% to 5% by mass of (B) a structural unit formed by polymerizing an ethylenically unsaturated carboxylic acid, 1% to 20% by mass of (C) a structural unit formed by polymerizing a vinyl monomer having a cyano group, 1% to 20% by mass of (D) a structural unit famed by polymerizing a monomer which is a reaction product of a (meth)acrylic acid and a monofunctional epoxy compound, and 0% to 50% by mass of (E) a structural unit formed by polymerizing other monomer which is capable of copolymerizing with at least one compound among the above monomers, based on 100% by mass of the total of the structural unit (A), the structural unit (B), the structural unit (C), the structural unit (D), and the structural unit (E).

In the present specification, "(meth)acrylate" means acrylate and methacrylate and "(meth)acryl" means acryl and methacryl.

[1] Coating Composition for Thick Coating

The coating composition for thick coating of the present invention is the one in which an aggregate is formulated into a specific emulsion composition. Namely, the coating composition contains polymer particles and an aggregate. The emulsion composition will be described later.

The above-mentioned "aggregate" is not particularly limited, as far as, in the coating composition containing the aggregate, thick coating can be performed, workability during application onto a surface to be coated is excellent, and a dried film obtained therefrom has sufficient tensile properties and the like. The aggregate may be of a powder generally used for a coating material or the like and example thereof includes an inorganic particle made of calcium carbonate, barium sulfate, silicon oxide, titanium oxide, talc, mica, kaolin, clay, ferrite, or quartz sand; an organic or an inorganic hollow balloon; or the like. These pigments may be used singly or in combination of two or more types thereof. The shape of the aggregate is not particularly limited and may be any of spherical, planular, and shapeless. The shape may be uniform and non-uniform. The average size of the aggregate is not particularly limited. The average particle size thereof measured by a laser diffraction method, an air permeability method, a sedimentation method, an electron microscopic observation method, a sieving method, or the like is preferably in the range from 0.01 to 1,000 µm, and particularly from 0.01 to 100 µm.

The content of the aggregate in the coating composition is not particularly limited. The content thereof can be in the range from 10 to 500 parts by mass based on 100 parts by mass of solid contents in the emulsion composition. It is preferably in the range from 20 to 300 parts by mass, more preferably from 40 to 200 parts by mass, and particularly from 60 to 150 parts by mass. When the content of the aggregate is in the range from 10 to 500 parts by mass, thick coating properties are excellent, and a dried film having sufficient tensile properties and the like can be formed.

The content of the aggregate in the coating composition may be expressed by pigment volume concentration (hereinafter, abbreviated as "PVC"). The PVC may be in the range from 5% to 60%, and is preferably from 10% to 40%, and particularly from 10% to 30%. When the PVC is in the range from 5% to 60%, workability during application onto a surface to be coated is excellent, and a dried film having sufficient tensile properties and the like can be formed.

The PVC is calculated as following. Mass of each component in the coating composition is divided by respective specific gravity to obtain volume of each; then, volume of the aggregate (summed-up volume when two or more aggregates are used) is divided by total volume and multiplied by 100 to obtain PVC (unit: %). In the present invention, each mass of polymer particles, an aggregate, and other additives, is divided by respective specific gravity to obtain volume of each; then, volume of the aggregate (summed-up volume when two or more aggregates are used) is divided by total volume and multiplied by 100.

The coating composition may contain various additives. Examples of the additive include a dispersant, an anti-foaming agent, a viscosity modifier, a thickener, a leveling agent, an anti-dripping agent, a pigment, a pH-controlling agent, a crosslinking agent, a plasticizer, a stabilizer, an antiseptic agent, a mildew-proof agent, an anti-freezing agent, a coating adjuvant, a solvent, an antibacterial agent, an antioxidant, other additives, additional materials and the like.

Further, an additive generally used in a paint, a coating material, a waterproof material, a mortar, a concrete, and the like, including an inorganic fiber such as a glass fiber, an organic fiber such as a polypropylene resin fiber, a surface-tension modifier, a cement, a multivalent metal salt, and an oxide, may also be added as appropriate.

Examples of the cement include ordinary portland cement, early strength Portland cement, fly ash cement, slug cement, colloid cement, alumina cement, and the like.

Examples of the multivalent metal salt and the oxide include a chloride, a sulfate, a nitrate, an acetate, and an oxide of a metal element such as magnesium, barium, aluminum, calcium, and zinc.

Examples of the dispersant include a salt of a higher fatty acid, a polycarboxylic acid, poly vinyl alcohol, methyl cellulose, ethyl cellulose, carboxymethyl cellulose, poly ethylene glycol, and the like. These dispersants may used singly or in combination of two or more types thereof. When the dispersant is used, the usage is preferably in the range from 1 to 30 parts by mass, more preferably from 2 to 25 parts by mass, and particularly from 3 to 20 parts by mass, based on 100 parts by mass of the emulsion composition.

Examples of the antifoaming agent include an antifoaming agent of a silicon compound, a fatty oil, a fatty acid, a fatty acid ester and a phosphate ester; and a compound thereof in which a part of the antifoaming agent is modified. These antifoaming agents may used singly or in combination of two or more types thereof. When two or more antifoaming agents are used, any of the antifoaming agents of a silicon compound, a fatty oil, a fatty acid, a fatty acid ester and a phosphate ester may be used in any combination thereamong. When the antifoaming agent is used, the usage is preferably in the range from 0.5 to 5 parts by mass, more preferably from 0.5 to 4 parts by mass, and particularly from 0.7 to 3 parts by mass, based on 100 parts by mass of the emulsion composition.

Examples of the viscosity modifier include an organic substance such as carboxymethyl cellulose, methyl cellulose, hydroxy cellulose, polyacrylic acid, polyacrylic acid sodium salt, carboxyl-modified polyacrylic acid, polyethylene oxide, polyurethane, alginic acid, natural polysaccharide and derivative thereof, poly vinyl alcohol, polyvinyl pyrrolidone, poly vinyl ether maleic acid and poly vinyl benzyl ether; and an inorganic particle made of bentonite, silica fume, aerosil, sepiolite, attapulgite or the like. The viscosity modifier may be used singly or in combination of two or more types thereof. In the case where the viscosity modifier is used, the usage amount thereof is preferably in the range from 0.01 to 20 parts by mass, more preferably from 0.1 to 10 parts by mass, and particularly from 0.1 to 5 parts by mass, based on 100 parts by mass of the emulsion composition.

As to the pigment, any of organic and inorganic pigments may be used. Examples of the organic pigment include an azo pigment such as an insoluble azo pigment, a condensed azo pigment, an azo lake and a chelate azo pigment; a polycyclic pigment such as a phthalocyanine pigment, a perylene pigment, a perynone pigment, an anthraquinone pigment, a quinacridone pigment, a dioxazine pigment, a thioindigo pigment, an isoindolinone pigment and a quinophthalone pigment; a dye lake, a nitro pigment, a nitroso pigment, aniline black, a fluorescent pigment, and the like. Among the organic pigments, an azo pigment, a phthalocyanine pigment and a polycyclic pigment are preferable. Examples of the inorganic pigment include titanium oxide, carbon black, red iron oxide, cadmium red, molybdenum orange, yellow iron oxide, yellow lead, titanium yellow, chromium green, chromium oxide, cobalt blue, manganese violet, and the like. These pigments may be used singly or in combination of two or more types thereof. In the case of using a pigment, the usage amount thereof is preferably in the range from 0.01 to 10 parts by mass and particularly from 0.1 to 5 parts by mass, based on 100 parts by mass of the emulsion composition.

The viscosity of the coating composition is not particularly limited. The viscosity measured by BM-type viscometer at a temperature of 25° C. is usually in the range from 1,000 to 200,000 mPa·s, preferably from 3,000 to 100,000 mPa·s, and particularly from 5,000 to 50,000 mPa·s. In addition, pH of the emulsion composition is preferably in the range from 1 to 10. and pH of the coating composition is preferably from 3 to 13.

The coating composition for thick coating of the present invention is particularly useful in various applications which requires waterproof and framework protection, and leads to a dried film having excellent tensile properties. The tensile strength and elongation of the dried film are not particularly limited. A dried film having a tensile strength in the range between 0.5 and 3.0 N/mm and an elongation in the range between 50% and 2,000% that are measured according to JIS A 6021 can be formed. Within the above-mentioned range, not only a dried film having comparatively small tensile strength and large elongation, namely a dried film having higher flexibility, but also a dried film having comparatively large tensile strength and small elongation, namely a dried film having higher rigidity, can be formed. Determination of the coating composition in relation to properties of a dried film formed therefrom is preferably made in view of more required physical properties for waterproof and framework protection.

The material of an underlying bed onto which the coating composition for thick coating of the present invention is applied is not particularly limited. The coating composition can be applied to any architectural materials including a cement concrete, an ALC panel, a precast concrete plate, a mortar, a slate, a metal, a glass, a wooden material, an insulation material, and a plastics. The application object further includes the above-mentioned underlying bed finished with a coating material, a mono-layer elastic coating material, a slightly elastic coating material, a spraying tile, an elastic tile, a lithin, a stucco, a plaster, and a tile; in addition, included is a underlying bed coated with a water repellent material. The application may be made on surface of an underlying bed coated with an acrylic resin, an acrylurethane resin, an acrylsilicone resin, a fluoro resin, an inorganic coating material, or the like as the finishing coating material.

Prior to application of a coating composition, it is desirable to make a underlying bed flat by treating concavities and convexities or spaces and defects on surface of the underlying bed with a sealing material, a polymer-modified mortar, an epoxy resin putty, or the coating composition of the present invention.

To secure adhesiveness of the coating composition for thick coating with an underlying bed, a primer or a sealer of such types as a water-base, a weak solvent-base, and a solvent-base, which are mainly comprised of an acrylic resin, an epoxy resin or a urethane resin, may be applied as appropriate in advance.

The coating composition for thick coating of the present invention may be applied with an ordinary method. Generally used methods for application onto a surface to be coated, such as, for example, coating by a brush, a roller, a spatula, or the like, or spraying with a spray gun, may be used.

In the case that a coated film is formed on a surface to be coated with the coating composition for thick coating of the present invention, the coated film may also be reinforced with a cloth, a mesh, or the like of a polyester, a glass, and the like.

The thickness of the dried film formed using the coating composition is not particularly limited. The thickness is preferably in the range from 100 to 5,000 μm. If the thickness is less than 100 μm, a continuous dried film without penetration holes is difficult to be formed. On the other hand, if the thickness exceeds 5000 μm, film formability by drying may be reduced.

After the coating composition for thick coating of the present invention is applied, a waterproof coating material containing an acrylic resin, an acrylic rubber, a urethane rubber or chloroprene rubber, a monolayer elastic coating material, a thin exterior coating material (lithin), a finishing coating material for juraku finish, stucco finish, or quasi-stone finish, a design coating material, a cement mortar, a polymer-modified mortar, an insulation material, a finishing coating material containing an acrylic resin, an acrylurethane resin, an acrylsilicone resin or a fluorine resin, or the like may be applied. These may be used singly or in combination of two or more types thereof.

[2] Emulsion Composition

The above-mentioned "emulsion composition" is an aqueous dispersion where a polymer particle having structural units formed by polymerization of monomers is dispersed in an aqueous medium. The aqueous medium is not particularly limited. Only water may be used, or a mixed liquid of water and an organic solvent selected from the group of methyl alcohol, ethyl alcohol, acetone, dimethyl ether, diethyl ether, dimethyl sulfoxide and dimethyl formamide that are easy to dissolve in water. In the case of the mixed liquid, the content of water is not particularly limited. The content thereof is usually 30% or more by mass, and preferably 50% or more by mass, based on 100% by mass of the mixed liquid.

The above-mentioned "polymer particle" is a polymer particle having, at least, (A) a structural unit formed by polymerizing an alkyl (meth)acrylate monomer having an alkyl group with 4 to 14 carbon atoms, (B) a structural unit formed by polymerizing an ethylenically unsaturated carboxylic acid monomer, (C) a structural unit formed by polymerizing a vinyl monomer having a cyano group, and (D) a structural unit formed by polymerizing a monomer which is a reaction product of a (meth)acrylic acid and a monofunctional epoxy compound. Additionally, the polymer particle may have (E) a structural unit formed by polymerizing other monomer which is capable of copolymerizing with at least one compound among the above monomers. The state of the polymer particle is not particularly limited. The polymer particle is consisting of a polymer in the state of a solid or a semi-solid solid such as a gel.

The average particle size of the polymer particles, measured by a laser diffraction/scattering particle analyzer "Microtrac MT-3000" (type name) manufactured by Nikkiso Co., Ltd. is not particularly limited and is preferably 5 μm or less, more preferably in the range from 0.01 to 5 μm, and particularly from 0.01 to 1 μm. When the average size of the polymer particles is 5 μm or less, particularly in the range from 0.01 to 5 μm, a coating composition has an excellent storage stability.

Examples of the "alkyl(meth)acrylate monomer having an alkyl group with 4 to 14 carbon atoms" for the formation of the "structural unit (A)" include n-butyl(meth)acrylate, isobutyl(meth)acrylate, sec-butyl(meth)acrylate, tert-butyl (meth)acrylate, n-pentyl(meth)acrylate, isoamyl(meth)acrylate, n-hexyl(meth)acrylate, 2-methylpentyl(meth)acrylate, n-octyl(meth)acrylate, 2-ethylhexyl(meth)acrylate, n-octyl (meth)acrylate, isooctyl(meth)acrylate, n-nonyl(meth)acrylate, isononyl(meth)acrylate, 2-methyloctyl(meth)acrylate, 2-ethylhexyl(meth)acrylate, decyl(meth)acrylate, dodecyl (meth)acrylate, tridecyl(meth)acrylate, lauryl(meth)acrylate, cyclohexyl(meth)acrylate, isobornyl(meth)acrylate, and the like. These alkyl(meth)acrylates may be used singly or in combination of two or more types thereof.

The content of the structural unit (A) is in the range from 40% to 98% by mass, preferably from 50% to 95% by mass, and particularly from 60% to 95% by mass, based on 100% by mass of the total of the structural unit (A), the structural unit (B), the structural unit (C), the structural unit (D), and the structural unit (E). The coating composition having the content of the structural unit (A) in the range from 40% to 98% by mass leads to a dried film having an excellent flexibility and low-temperature resistance.

Examples of the above-mentioned "ethylenically unsaturated carboxylic acid" for the formation of the "structural unit (B)" include an unsaturated monobasic acid such as acrylic acid, methacrylic acid, crotonic acid, vinylacetic acid, and acryloxypropionic acid; an unsaturated dibasic acid such as maleic acid, itaconic acid, fumaric acid, mesaconic acid, citraconic acid and cyclohexane dicarboxylic acid; an unsaturated anhydride such as maleic anhydride, itaconic anhydride, citraconic anhydride and tetrahydrophthalic anhydride; and the like. These ethylenically unsaturated carboxylic acids may be used singly or in combination of two or more types thereof. Among these, (meth)acrylic acid is preferred from the viewpoint of cheapness and easy polymerizability with other monomers.

The content of the structural unit (B) is in the range from 0.1% to 5% by mass, preferably from 0.2% to 3% by mass, and particularly from 0.3% to 3.5% by mass, based on 100% by mass of the total of the structural unit (A), the structural unit (B), the structural unit (C), the structural unit (D), and the structural unit (E). The coating composition having the content of the structural unit (B) in the range from 0.1% to 5% by mass leads to a dried film having an excellent coagulation power. If the content is less than 0.1% by mass, the polymerization may not be stably preceded. On the other hand, if the content is more than 5% by mass, the viscosity may be increased during neutralization of the emulsion composition.

Examples of the "vinyl monomer having a cyano group" for the formation of the "structural unit (C)" include acrylonitrile, methacrylonitrile, α-ethylacrylonitrile, α-isopropylacrylonitrile, α-chloroacrylonitrile, α-fluoroacrylonitrile, and the like. These vinyl monomers having a cyano group may be used singly or in combination of two or more types thereof.

The content of the structural unit (C) is in the range from 1% to 20% by mass, preferably from 2% to 18% by mass, and particularly from 3% to 15% by mass, based on 100% by mass of the total of the structural unit (A), the structural unit (B), the structural unit (C), the structural unit (D), and the structural unit (E). The coating composition having the content of the structural unit (C) in the range from 1% to 20% by mass leads to a dried film having an excellent flexibility and rubber elasticity. On the other hand, if the content of the structural unit (C) is more than 20% by mass, water resistance of a dried film may be decreased.

The "monomer which is a reaction product of a (meth) acrylic acid and a monofunctional epoxy compound (D)" for the formation of the "structural unit (D)" is preferably a compound having a (meth)acryloyl group which is obtained by reaction of a (meth)acrylic acid and a monofunctional epoxy compound.

Examples of the monofunctional epoxy compound include butyl glycidyl ether, 2-ethylhexyl glycidyl ether, stearyl glycidyl ether, lauryl glycidyl ether, butoxy polyethylene glycol glycidyl ether, phenol polyethylene glycol glycidyl ether, aryl glycidyl ether, phenyl glycidyl ether, p-methyphenyl glycidyl ether, p-ethylphenyl glycidyl ether, p-sec-butylphenyl glycidyl ether, p-tert-butylphenyl glycidyl ether, and the like. These monofunctional epoxy compounds may be used singly or in combination of two or more types thereof.

Among these monofunctional epoxy compounds, a monofunctional epoxy compound having a phenyl group is preferable. Examples of the specific compound include phenol polyethylene glycol glycidyl ether, phenyl glycidyl ether, p-methyphenyl glycidyl ether, p-ethylphenyl glycidyl ether, p-sec-butylphenyl glycidyl ether, p-tert-butylphenyl glycidyl ether, and the like.

In addition, specific examples of the monomer which is a reaction product of a (meth)acrylic acid and a monofunctional epoxy compound include 2-hydroxy-3-phenoxypropyl acrylate which is represented by the following formula (1), 2-hydroxy-3-p-methylphenoxypropyl acrylate which is represented by the following formula (2), 2-hydroxy-3-2-ethylhexyloxypropyl acrylate which is represented by the following formula (3), and the like. These monomers may be used singly or in combination of two or more types thereof.

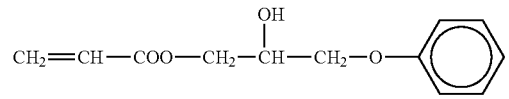

(1)

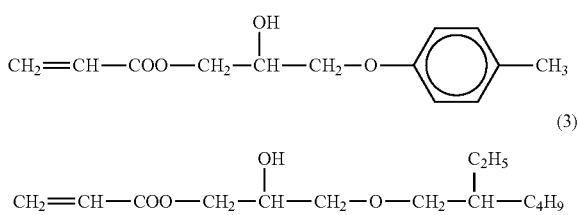

(2)

(3)

The content of the structural unit (D) is in the range from 1% to 20% by mass, preferably from 2% to 18% by mass, and particularly from 4% to 15% by mass, based on 100% by mass of the total of the structural unit (A), the structural unit (B), the structural unit (C), the structural unit (D), and the structural unit (E). When the content of the structural unit (D) is in the range from 1% to 20% by mass, the coating composition leads to a dried film having excellent adhesiveness. On the other hand, if the content is less than 1% by mass, adhesiveness may not be sufficient. If the content exceeds 20% by mass, flexibility of the dried film may be lowered and polymerization stability during producing the emulsion composition may be lowered.

The "other monomer" used for the formation of "composition unit (E)" obtaining by polymerization of the "other monomer" that is copolymerizable with at least any one of the above-mentioned monomers is not particularly limited. Other unsaturated compounds having radical polymerizability can be used except the above-mentioned monomers. Example thereof includes an alkyl(meth)acrylate monomer having an alkyl group with 1 to 3 carbon atoms, a vinyl monomer having a hydroxyl group, a vinyl monomer having an amino group, a vinyl monomer having an amide group, a vinyl monomer having an alkoxyl group, an aromatic vinyl monomer, a conjugated diene monomer, a maleimide monomer, a vinylester monomer, a vinylether monomer, a vinyl monomer having a glycidyl group, an unsaturated dicarboxylic acid monoalkyl ester, an unsaturated dicarboxylic acid dialkyl ester, a monomer having a silicon-containing group, and the like. These unsaturated compounds may be used singly or in combination of two or more types thereof.

Examples of the alkyl(meth)acrylate monomer having an alkyl group with 1 to 3 carbon atoms include methyl(meth) acrylate, ethyl(meth)acrylate, n-propyl(meth)acrylate, isopropyl(meth)acrylate, and the like. These alkyl(meth)acrylate monomers may used singly or in combination of two or more types thereof.

Examples of the vinyl monomer having a hydroxyl group include 2-hydroxyethyl(meth)acrylate, 2-hydroxypropyl (meth)acrylate, 3-hydroxypropyl(meth)acrylate, 2-hydroxybutyl(meth)acrylate, 3-hydroxybutyl(meth)acrylate, 4-hydroxybutyl(meth)acrylate, 6-hydroxyhexyl(meth)acrylate, 8-hydroxyoctyl(meth)acrylate, 12-hydroxylauryl(meth) acrylate, a mono(meth)acrylate of a polyethylene glycol such as polyethylene glycol and polypropylene glycol, p-hydroxy styrene, m-hydroxy styrene, o-hydroxy styrene, p-isopropenylphenol, m-isopropenylphenol, o-isopropenylphenol, and the like. These vinyl monomers having a hydroxyl group may be used singly or in combination of two or more types thereof.

Examples of the vinyl monomer having an amino group include aminoethyl(meth)acrylate, dimethylaminomethyl (meth)acrylate, diethylaminomethyl(meth)acrylate, 2-dimethylaminoethyl(meth)acrylate, 2-diethylaminoethyl(meth) acrylate, 2-(di-n-propylamino)ethyl(meth)acrylate, 2-dimethylaminopropyl(meth)acrylate, 2-diethylaminopropyl(meth)acrylate, 2-(di-n-propylamino)propyl(meth)acrylate, 3-dimethylaminopropyl(meth)acrylate, 3-diethylaminopropyl(meth)acrylate, 3-(di-n-propylamino)propyl(meth) acrylate, and the like. These vinyl monomers having an amino group may be used singly or in combination of two or more types thereof.

Examples of the vinyl monomer having an amide group include (meth)acrylamide, N-methyl(meth)acrylamide, N,N-dimethyl(meth)acrylamide, N,N-dimethylaminopropyl (meth)acrylamide, N,N-butoxymethyl(meth)acrylamide, N-methylol(meth)acrylamide, N-alkoxymethyl(meth)acrylamide, and the like. These vinyl monomers having an amide group may be used singly or in combination of two or more types thereof.

Examples of the vinyl monomer having an alkoxyl group include 2-methoxyethyl(meth)acrylate, 2-ethoxyethyl(meth) acrylate, 2-(n-propoxy)ethyl(meth)acrylate, 2-(n-butoxy) ethyl(meth)acrylate, 3-methoxypropyl(meth)acrylate, 3-ethoxypropyl(meth)acrylate, 2-(n-propoxy)propyl(meth) acrylate, 2-(n-butoxy)propyl(meth)acrylate, and the like. These vinyl monomers having an alkoxyl group may be used singly or in combination of two or more types thereof.

Examples of the aromatic vinyl monomer include styrene, 2-methyl styrene, 3-methyl styrene, 4-methyl styrene, α-methyl styrene, 2,4-dimethyl styrene, 2,4-diisopropyl styrene, 4-tert-butyl styrene, tert-butoxy styrene, vinyl toluene, divinyl toluene, benzyl(meth)acrylate, vinyl naphthalene, monochlorostyrene, dichlorostyrene, monobromostyrene, dibromostyrene, tribromostyrene, fluorostyrene, styrene sulfonate and the salt thereof, α-methyl styrene sulfonate and the salt thereof, and the like. These aromatic vinyl monomers may be used singly or in combination of two or more types thereof.

Examples of the conjugated diene monomer include 1,3-butadiene, isoprene(2-methyl-1,3-butadiene), 2,3-dimethyl-1,3-butadiene, chloroprene(2-chloro-1,3-butadiene), and the like. These conjugated diene monomers may be used singly or in combination of two or more types thereof.

Examples of the maleimide monomer include maleimide, N-methyl maleimide, N-isopropyl maleimide, N-butyl maleimide, N-dodecyl maleimide, N-phenyl maleimide, N-(2-methylphenyl)maleimide, N-(4-methylphenyl)maleimide, N-(2,6-dimethylphenyl)maleimide, N-(2,6-diethylphenyl) maleimide, N-(2-methoxyphenyl)maleimide, N-benzyl maleimide, N-(4-hydroxyphenyl)maleimide, N-naphthyl maleimide, N-cyclohexyl maleimide, and the like. These maleimide monomers may be used singly or in combination of two or more types thereof.

Examples of the vinyl ester monomer include a methylene aliphatic monocarboxylic acid ester, vinyl acetate, vinyl propionate, vinyl pivalate, vinyl butyrate, vinyl benzoate, vinyl formate, vinylcinnamate, vinyl versate, and the like. The vinyl ester monomers may be used singly or in combination of two or more types thereof.

Examples of the vinyl ether monomer include vinyl methyl ether, vinyl ethyl ether, vinyl n-butyl ether, vinyl isobutyl ether, vinyl phenyl ether, vinyl cyclohexyl ether, and the like. The vinyl ether monomers may be used singly or in combination of two or more types thereof.

Examples of the vinyl monomer having a glycidyl group include glycidyl(meth)acrylate, (meth)allyl glycidyl ether, β-methyl glycidyl(meth)acrylate, 4-hydroxybutyl glycidyl (meth)acrylate, 3,4-epoxycyclohexylmethyl(meth)acrylate, 3,4-epoxycyclohexylethyl(meth)acrylate, 3,4-epoxycyclohexylpropyl(meth)acrylate, and the like. These monomers may be used singly or in combination of two or more types thereof.

Examples of the unsaturated dicarboxylic acid monoalkyl ester include a monoalkyl ester of an unsaturated dicarboxylic acid such as maleic acid, fumaric acid, itaconic acid, citraconic acid, mesaconic acid, maleic anhydride, itaconic anhydride, citraconic anhydride, and tetrahydrophthalic anhydride. These monoalkyl esters may be used singly or in combination of two or more types thereof. In addition, examples of the unsaturated dicarboxylic acid dialkyl ester include a dialkyl ester of an unsaturated dicarboxylic acid such as maleic acid, fumaric acid, itaconic acid, citraconic acid, mesaconic acid, maleic anhydride, itaconic anhydride, citraconic anhydride, and tetrahydrophthalic anhydride. These dialkyl esters may be used singly or in combination of two or more types thereof.

Examples of the monomer having a silicon-containing group include vinyl trichlorosilane, vinyl tribromosilane, vinyl trimethoxysilane, vinyl triethoxysilane, vinyl tri-n-propoxysilane, vinyl tri-isopropoxysilane, vinyl tri-n-butoxysilane, vinyl tris(2-hydroxymethoxyethoxy)silane, vinyl triacetoxysilane, vinyl diethoxysilanol, vinyl ethoxysiladiol, vinyl methyldiethoxysilane, vinyl dimethylethoxysilane, vinyl methyldiacetoxysilane, allyl trimethoxysilane, allyl triethoxysilane, 3-methacryloxypropyl trimethoxysilane, 3-acryloxypropyl triethoxysilane, 3-methacryloxypropyl tris(2-methoxyethoxy)silane, 3-methacryloxypropyl methyldiethoxysilane, 3-methacryloxypropyl dimethylethoxysilane, 3-acryloxypropyl dimethoxysilane, 2-acrylamide ethyltriethoxysilane, and the like. These monomers may be used singly or in combination of two or more types thereof.

Among the other monomers, an alkyl(meth)acrylate monomer having an alkyl group with 1 to 3 carbon atoms, a vinyl monomer having a hydroxyl group, and an aromatic vinyl monomer are preferable. When these monomers are used, the emulsion composition can be obtained excellent in adhesiveness, flexibility and coagulation power at lower cost.

The content of the structural unit (E) is in the range from 0% to 50% by mass, preferably from 0.3% to 45% by mass, and particularly from 0.4% to 40% by mass, based on 100% by mass of the total of the structural unit (A), the structural unit (B), the structural unit (C), the structural unit (D), and the structural unit (E).

Here, "0% by mass" of the content of the structural unit (E) means that the structural unit (E) is not included in the polymer particle at all. The structural unit (E) may be contained or not be contained in the polymer particle. When the structural unit (E) is included, the content thereof is preferably 50% or less by mass, more preferably in the range from 0.3% to 45% by mass, and particularly from 0.4% to 40% by mass.

Tg of the polymer particle is not particularly limited. Tg is preferably in the range from −80° C. to 10° C., more preferably from −80° C. to 0° C., and particularly from −80° C. to −10° C. The coating composition containing a polymer particle having Tg in the range from −80° C. to 10° C. leads to a dried film having an excellent adhesiveness and low-temperature resistance. Tg of the polymer particle can be measured with a differential scanning calorimeter (DSC).

The solid component contained in the emulsion composition is substantially a polymer particle. The content of the solid component is usually in the range from 1% to 90% by mass, preferably from 5% to 75% by mass, and particularly from 30% to 70% by mass. Moreover, the viscosity of the emulsion composition by BM-type viscometer is not particularly limited. The viscosity at a temperature of 25° C. is usually in the range from 1 to 50,000 mPa·s, preferably from 10 to 10,000 mPa·s, and particularly from 20 to 5,000 mPa·s.

[3] Production Method of Emulsion Composition

The method for producing the emulsion composition contained in the coating composition for thick coating of the present invention has a polymerization process in which the above-mentioned various monomers are polymerized in an aqueous medium. In this polymerization process, the monomers are polymerized to form polymer particles dispersed in the aqueous medium. The polymerization method of the monomers is not particularly limited and usual method for vinyl-based monomer can be applied such as emulsion polymerization and suspension polymerization. The polymerization can be conducted in a heated reaction system containing an aqueous medium while stirring and refluxing with cooling.

More specifically, polymerization may be effected by the methods as following.

(1) a method in which polymerization is conducted while into a mixture containing an aqueous medium, a part of monomers, and a part of (or one kind of) emulsifier, are added a radical polymerization initiator, the rest of the monomers, and the rest of the emulsifier.

(2) a method in which polymerization is conducted while into a mixture containing an aqueous medium, a part of monomers, and entirety of emulsifier (which may be one kind), are added a radical polymerization initiator and the rest of the monomers.

(3) a method in which polymerization is conducted while into a mixture containing an aqueous medium, entirety of monomers, and a part of (or one kind of) emulsifier, are added a radical polymerization initiator and the rest of the emulsifier.

(4) a method in which polymerization is conducted while a radical polymerization initiator is added into a mixture containing of an aqueous medium, entirety of monomers, and entirety of emulsifier (which may be one kind).

(5) a method in which polymerization is conducted while monomers, an emulsifier and a radical polymerization initiator are individually added to an aqueous medium (in the case where two or more emulsifiers are used, each emulsifier and monomer may be added individually or as a partial mixture thereof).

Meanwhile, as to the type and ratio of the monomers used for the production of the emulsion composition, type of monomers in the above-mentioned emulsion composition and values used in structural units of the polymer obtained from these monomers may be as same as those described before.

The emulsifier is not particularly limited. An anionic emulsifier, a nonionic emulsifier, a cationic emulsifier, and an amphoteric emulsifier may be used. Examples of the anionic emulsifier include a salt of a dialkylsulfo succinate, a salt of an alkylbenzenesulfonate, a salt of an alkylsulfate, a salt of a polyoxyethylene alkylphenylether sulfate, a salt of a polyoxyethylene alkyldiphenylether sulfate, a salt of a polyoxyethylene alkylether sulfate, a salt of an alkyldiphenylether disulfonate, a polymer emulsifier, and the like. Examples of the nonionic emulsifier include a polyoxyethylene higher alcohol ether, a polyoxyethylene alkylphenylether, a polyoxyethylene alkyldiphenylether, polyoxyethylene-polyoxypropylene block copolymer, an acetylene diol-based emulsifier, a sorbitane higher fatty acid ester, a polyoxyethylene sorbitane higher fatty acid ester, a polyoxyethylene higher fatty acid ester, a glycerine higher fatty acid ester, a polycarboxylic acid type polymer emulsifier, a polyvinyl alcohol, and the like. Examples of the cationic emulsifier include an alkyl(amide)betaine, an alkyldimethyl amine oxide, and the like. These emulsifiers may be used singly or in combination of two or more types thereof.

In addition to the above-mentioned emulsifiers, a fluorinated emulsifier and a silicone-based emulsifier may also be used as a specialty emulsifier.

The emulsifier may be a reactive emulsifier. An emulsifier having a polymerizable functional group such as an ethylenic double bond can be used as the reactive emulsifier. Specific examples of the reactive emulsifier include ones represented by the following formulae (4) to (15). These reactive emulsifiers may be used singly or in combination of two or more types thereof. When the polymer particles are formed by emulsion polymerization in the presence of a reactive emulsifier, a coating composition can be obtained leading to a dried film having an excellent water resistance. This is especially useful in a field that requires waterproof.

mass, and particularly from 0.5 to 20 parts by mass, based on 100 parts by mass of total monomers.

The monomers can be polymerized in the presence of a radial polymerization initiator such as a peroxide and an azo compound. Polymerization may be effected with a redox polymerization initiator by concurrently using a peroxide and a reducing agent such as ascorbic acid, sodium ascorbate, sodium erythorbate, oxalic acid, succinic acid, a metal salt of formaldehyde sulfoxylate, sodium thiosulfate, sodium sulfite, sodium bisulfite, sodium metabisulfite, and ferric chloride.

Examples of the peroxide include hydrogen peroxide, an inorganic peroxide of persulfate salt such as sodium persulfate, ammonium persulfate and potassium persulfate. Further,

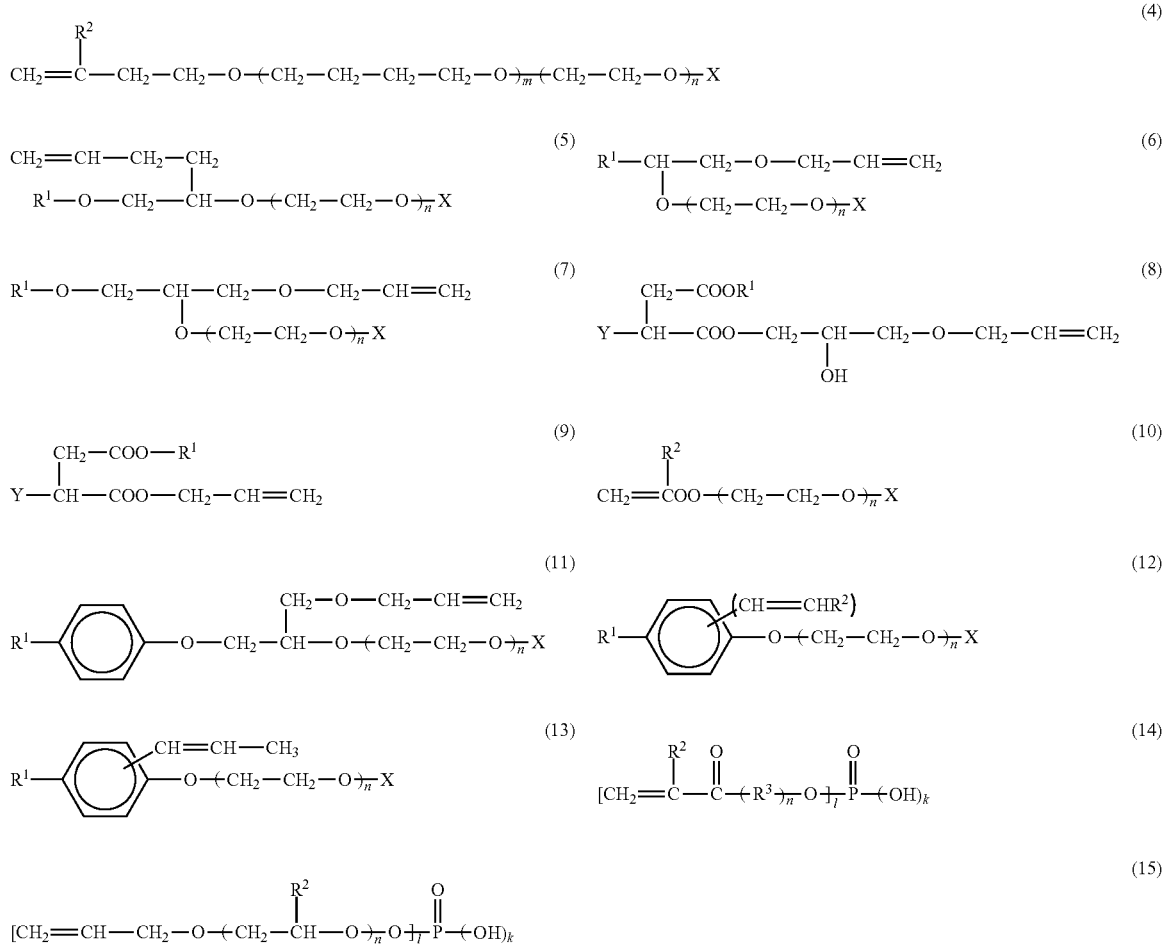

In the above-mentioned formulae (4) to (15), $R^1$ is an alkyl group, $R^2$ is a hydrogen atom or a methyl group, $R^3$ is an alkylene group, n and m are each an integer of 1 or more, l and k are each an integer of 1 or more, and l+k=3. Additionally, X is a hydrogen atom, $-SO_3NH_4$, or $-SO_3Na$, and Y is $-SO_3NH_4$ or $-SO_3Na$.

The usage amount of the emulsifier can be appropriately selected depending on polymerization conditions and the like. In the case of using a specialty emulsifier and the above-mentioned reactive emulsifier, the usage amount of the emulsifiers including these emulsifiers is usually in the range from 0.1 to 50 parts by mass, preferably from 0.3 to 30 parts by an organic peroxide may be used such as a hydroperoxide such as cumene hydroperoxide, paramenthane hydroperoxide and tert-butyl hydroperoxide; a dialkylperoxide such as tert-butyl cumyl peroxide and dicumyl peroxide; a diacyl peroxide; a peroxy ester such as tert-butyl peroxy laurate and tert-butyl peroxy benzoate; benzoyl peroxide, lauroyl peroxide, peracetic acid, and persuccinic acid. These peroxides may be used singly or in combination of two or more types thereof.

Examples of the azo compound include 2,2'-azobisisobutyronitrile, 2,2'-azobis(2,4-dimethylvaleronitrile), 2,2'-azobis(2-methylbutyronitrile), 2,2'-azobis(4-methoxy-2,4-dimethylvaleronitrile), 2,2'-azobis(2-amidinopropane)dihydro chloride, 2,2'-azobis[N-(2-carboxyethyl)-2-methylpropionediamine]tetrahydrate salt, and the like. These azo compounds may be used singly or in combination of two or more types thereof.

The usage amount of the radical polymerization initiator may be appropriately selected depending on polymerization conditions and the like. The usage amount thereof may be in the range from 0.01 to 10 parts by mass based on 100 parts by mass of total monomers.

In the polymerizing process, a chain transfer agent having a function of molecular weight control may also be used.

Examples of the chain transfer agent include a compound having a mercapto group such as ethane thiol, butane thiol, dodecane thiol, benzene thiol, toluene thiol, α-toluene thiol, phenetyl mercaptane, mercapto ethanol, 3-mercapto propanol, thioglycerine, thioglycolic acid, 2-mercapto propionic acid, 3-mercapto propionic acid, α-mercapto isolactic acid, methyl mercapto propionate, ethyl mercapto propionate, thioacetic acid, thiomalic acid, thiosalicylic acid, octyl mercaptane, n-dodecyl mercaptane, tert-dodecyl mercaptane, n-hexadecyl mercaptane, n-tetradecyl mercaptane and tert-tetradecyl mercaptane; a xanthic disulfide compound such as dimethyl xanthic disulfide, diethyl xanthic disulfide and diisopropyl xanthic disulfide; a thiuram disulfide compound such as tetramethyl thiuram disulfide, tetraethyl thiuram disulfide and tetrabutyl thiuram disulfide; a halogenated hydrocarbon such as carbon tetrachloride and ethylene bromide; an aromatic hydrocarbon such as pentaphenyl ethane and α-methylstyrene dimmer; and the like. These chain transfer agents may be used singly or in combination of two or more types thereof.

The polymerization temperature may be appropriately determined depending on types of monomers and radical polymerization initiator and the like. It is usually in the range from 60° C. to 95° C. Additionally, the pH of a reaction solution formed by polymerization, namely pH of the emulsion composition depends on types of monomers and radical polymerization initiator. The pH is usually controlled at a range from 1 to 9. and particularly from 2 to 8 in the case of the present invention in which monomers such as an alkyl (meth)acrylate and a unsaturated carboxylic acid are used.

The pH of the emulsion composition can be controlled after termination of the polymerization reaction. This control of pH can be usually done by adding a basic compound into the reaction solution. Examples of the basic compound include an alkaline metal compound such as sodium hydroxide and potassium hydroxide; an alkaline earth metal compound such as calcium hydroxide and calcium carbonate; ammonia; an organic amine compound such as monomethyl amine, dimethyl amine, trimethyl amine, monoethyl amine, diethyl amine, methyethyl amine, triethyl amine, monopropyl amine, dimethylpropyl amine, monoethanol amine, diethanol amine, triethanol amine, ethylene diamine, and diethylene triamine; and the like. The basic compound is preferably ammonia. These basic compounds may be used singly or in combination of two or more types thereof.

The basic compound may be used as it is. An aqueous solution may also be used which is obtained by dissolving the basic compound into water. The temperature of the reaction solution at the time of pH control is not particularly limited and may be the same or lower than the temperature of the reaction solution at the termination of the polymerization reaction.

EXAMPLES

Hereinafter, the present invention is specifically explained with Examples.

[1] Preparation of Emulsion Composition Used for Coating Composition for Thick Coating Preparation Example 1

An agitator, a reflux condenser, dropping funnels, a thermometer, and a nitrogen-inlet tube were equipped to a 3-liter volume flask, into which was then added 30 parts by mass of ion-exchanged water (hereinafter, the term "parts" means "parts by mass", and total amount of the monomers was made 100 parts). The temperature of contents was raised to 80° C. while introducing a nitrogen gas. Subsequently, a mixture of 37 parts of an ion-exchanged water, monomers consisting of 37 parts of 2-ethylhexyl acrylate, 37 parts of butyl acrylate, 12 parts of acrylonitrile, 3 parts of acrylic acid, and 11 parts of 2-hydroxy-3-phenoxypropyl acrylate, and 10 parts of an emulsifier (containing sodium polyoxyethylene alkylsulfate in an amount of active ingredient of 26%) "LATEMUL E118B" (trade name) manufactured by KAO Corp. was added from one dropping funnel, and 10 parts of an aqueous solution of ammonium persulfate with a concentration of 5% by mass (hereinafter, the term "%" means "% by mass" except for "PVC") was added from a different dropping funnel, wherein both solutions were added simultaneously and continuously for 5 hours with stirring to effect emulsion polymerization. Thereafter, an ammonia water with a concentration of 25% was added to the reaction solution to control pH thereof at a range from 5 to 7 with stirring, whereby an emulsion composition having the solid content of 55% was obtained. The calculated temperature of Tg for a polymer contained in the emulsion composition is −39.6° C.

Preparation Examples 2 to 8 and Comparative Preparation Examples 1 to 7

Emulsion polymerization was conducted in the same manner as those in Preparation Example 1 except that each monomer composition was based on one shown in Table 1 and Table 2 to produce an emulsion composition having a solid content of 55% for Preparation Examples 2 to 8 and Comparative Preparation Examples 1, 3 to 5. and 7.

In Comparative Preparation Example 2. polymer particles were aggregated during polymerization, resulting in gels. In Comparative Preparation Example 6. there was no abnormal phenomenon occurred during polymerization, but when an ammonia water with a concentration of 25% was added for controlling pH at a range from 6 to 7. polymer particles were aggregated, resulting in gels.

TABLE 1

|  |  | Tg(°C.) | Production Example | | | | | | | |
|---|---|---|---|---|---|---|---|---|---|---|
|  |  |  | 1 | 2 | 3 | 4 | 5 | 6 | 7 | 8 |
| Monomer | 2-Ethylhexyl acrylate | −70 | 37 | — | — | — | — | — | — | — |
|  | n-Butyl acrylate | −54 | 37 | 84 | 45 | 35 | 52 | 44 | — | 84 |
|  | Isononyl acrylate | −82 | — | — | 26 | 35 | — | — | 88 | — |
|  | Styrene | 100 | — | 4 | 7 | — | 31 | 41 | — | 3 |
|  | Acrylonitrile | 110 | 12 | 5 | 5 | 18 | 5 | 3 | 5 | 9.5 |
|  | Acrylic acid | 106 | 3 | 2 | 2 | 2 | 2 | 2 | 2 | 0.5 |
|  | 2-Hydroxy-3-phenoxypropyl acrylate | 17 | 11 | 5 | 15 | 10 | 10 | 10 | 5 | 3 |
|  | Total amount of monomers |  | 100 | 100 | 100 | 100 | 100 | 100 | 100 | 100 |
|  | Emulsifier (LATEMUL E118B) |  | 10 | 10 | 10 | 10 | 10 | 10 | 10 | 10 |
| Tg (° C.) |  |  | −39.6 | −40.4 | −40.7 | −40.3 | −5.2 | 6.0 | −71.5 | −39.4 |
| Solid content (wt %) |  |  | 55 | 55 | 55 | 55 | 55 | 55 | 55 | 55 |
| Polymerization stability |  |  | 1 | 1 | 1 | 1 | 1 | 1 | 1 | 1 |

TABLE 2

|  |  | Tg(°C.) | Comparative Production Example | | | | | | |
|---|---|---|---|---|---|---|---|---|---|
|  |  |  | 1 | 2 | 3 | 4 | 5 | 6 | 7 |
| Monomer | 2-Ethylhexyl acrylate | −70 | — | — | — | — | — | — | 90 |
|  | n-Butyl acrylate | −54 | 86 | 71.5 | 81 | — | 82 | 83 | — |
|  | Isononyl acrylate | −82 | — | — | — | 61 | — | — | — |
|  | Styrene | 100 | 7 | — | 7 | — | 3 | 3 | — |
|  | Acrylonitrile | 110 | 5 | 3 | — | 30 | 10 | 3 | 8 |
|  | Acrylic acid | 106 | 2 | 0.5 | 2 | 1 | — | 8 | 2 |
|  | 2-Hydroxy-3-phenoxypropyl acrylate | 17 | — | 25 | 10 | 8 | 5 | 3 | — |
|  | Total amount of monomers |  | 100 | 100 | 100 | 100 | 100 | 100 | 100 |
|  | Emulsifier (LATEMUL E118B) |  | 10 | 10 | 10 | 10 | 10 | 10 | 10 |
| Tg (° C.) |  |  | −40.3 | −35.9 | −39.6 | −39.3 | −38.2 | −38.4 | −60.0 |
| Solid content (wt %) |  |  | 55 | 55 | 55 | 55 | 55 | 55 | 55 |
| Polymerization stability |  |  | 1 | 2 | 1 | 1 | 1 | 2 | 1 |

[2] Production of Coating Composition for Thick Coating

Example 1

With 100 parts of the emulsion composition obtained by Preparation Example 1 were blended 60 parts of powdered heavy calcium carbonate having specific gravity of 2.7 as an aggregate, 5 parts of a 20% aqueous solution of sodium polyacrylate having molecular weight of about 20,000, 1.2 part of a silicone-based antifoaming agent "SN-defoamer 325" manufactured by SANNOPCO LTD., and 1 part of a water-containing gel of hydroxyethyl methyl cellulose with a concentration of 5% "Hi-Metolose SEB-04T" manufactured by Shin-Etsu Chemical Co., Ltd. as a viscosity modifier. The resulting solution was mixed to obtain a coating composition for thick coating having 28.0% PVC.

Examples 2 to 12 and Comparative Examples 1 to 7

Coating compositions for thick coating for Examples 2 to 12 and Comparative Examples 1 to 7 were prepared in the same manner as those of Example 1. except that types of the emulsion composition, and formulating amounts of the aggregate, the antifoaming agent and the viscosity modifier were changed as shown in Tables 3 to 6. and ordinary portland cement was added in Example 11 and Comparative Example 7.

It is noted that numbers in brackets in each column of Examples and Comparative Examples in Tables 3 to 6 indicate numbers of Preparation Example and Comparative Preparation Example of the respective emulsion compositions used.

[3] Evaluation of Performance

Performance of each coating composition for thick coating prepared in Examples 1 to 12 and Comparative Examples 1 to 7 in the above-mentioned [2] was evaluated as following.
(1) Tensile Strength and Elongation Tensile strength (N/mm$^2$) and elongation (%) were evaluated according to JIS A 6021.
(2) Adhesiveness
(a) Preparation of Test Piece Onto a flexible plate stipulated in JIS A 5430 was applied a two-pot reactive epoxy resin primer "ARON SUISEI PRIMER" (trade name) manufactured by TOAGOSEI Co., Ltd. with coating amount of 0.1 kg/m, and then it was allowed to stand for one day under the standard condition (temperature of 23° C. and humidity of 50%). Subsequently, an aqueous acryl silicone-based top coat "ARON SUISEI SUPER COLOR Si" (trade name) manufactured by TOAGOSEI Co., Ltd. was applied thereon with coating amount of 0.15 kg/m$^2$ twice, and then it was allowed to stand under the standard condition for 7 days to form a underlying bed for test. Thereafter, on this underlying bed was further applied the coating composition for thick coating so as to give film thickness of 200 μm, and then it was allowed to stand under the standard condition for one day. The above-mentioned aqueous acryl silicone-based top coat was then applied thereon with coating amount of 0.15 kg/m$^2$ twice, and then it was allowed to stand under the standard condition for 14 days to prepare a test piece.
(b) Treatment Water-immersion treatment and temperature cycle treatment were conducted using respective test pieces for each treatment.

(b-1) Water-Immersion Treatment

An epoxy-based adhesive was applied on a back and a side of the test piece and cured fully so that water might not penetrate thereinto from the back and the side of the test piece. Thereafter, the test piece was immersed in water of 23° C. for 7 days, taken out from water, allowed to stand for one day under the standard condition, and then subjected to evaluation.

(b-2) Temperature Cycle Treatment

An epoxy-based adhesive was applied on a back and a side of the test piece and cured fully so that water might not penetrate thereinto from the back and the side of the test piece. The test piece was then immersed in water of 20° C. for 18 hours in accordance with JIS A 6909. After that, the test piece was taken out from water, and immediately thereafter the test piece was subjected to the temperature cycle test with one cycle of 24 hours for 10 times between cooling in a constant temperature chamber controlled at −20° C. for 3 hours and heating in a constant temperature chamber controlled at 50° C. for 3 hours. Subsequently, the test piece was allowed to stand under the standard condition for more than 48 hours and was subjected to evaluation.

(c) Evaluation

Each of test pieces after the water-immersion treatment and the temperature cycle treatment was evaluated as to the following items.

(c-1) Appearance

The test piece after the treatment was evaluated by visual observation.

The evaluation criteria thereof were as follows.

"1": There were no abnormalities such as peel-off, swollenness and crack.

"2": Surface was deformed to an orange-like skin (very small swollenness having size of 0.5 mm or less could be seen in entire surface by careful visual observation) due to absorbed water in the film; or 5 or more small cracks having length of 5 mm or less were observed.

"3": Abnormality worse than the above-mentioned criterion "2" was observed in any or all of peel-off, swollenness, and crack.

(c-2) Peel Resistance

The test piece after the treatment was cut-in with a rectangular shape having width of 5 mm and length of 50 mm so as to penetrate through the uppermost layer of the aqueous acryl silicone-based top coat and the dried film. After that, visual observation was made on whether or not the peel-off took place when the top coat and the dried film were pinched at the edge of the long side of the incision and then pulled up vertically from interface between the dried film and the underlying bed for test.

The evaluation criteria thereof were as follows.

"1": Peel-off was not observed at the interface between the dried film and the underlying bed for test; instead, cohesive destruction was observed in the film.

"2": Peel-off took place easily at the interface between the dried film and the underlying bed for test.

(c-3) Cross-Cut Adhesion Test

Based on JIS K 5600-5-6. the test piece after the treatment was cut-in with an interval of 2 mm so as to penetrate through the uppermost layer of the aqueous acryl silicone-based top coat and the dried film to form 25 grids (5 grids each on vertical and horizontal directions). After that, an adhesive tape was attached to and pulled up from the grids, whereby number of grids remained on the test piece was counted for evaluation.

In Tables 3 to 6. the results are shown by "number of remained grids/25 grids (total grid number)".

(3) Storage Stability

The coating composition for thick coating was visually confirmed that there was no abnormality in appearance, and then the composition was transferred to a 500-mL plastic vessel till 90% in height. Subsequently, the viscosity thereof was measured by Brookfield type viscometer at a temperature of 25° C. (rotation at 12 revolutions/minute for 90 seconds by using No. 4 rotor). After the measurement, the vessel was tightly sealed with a cap, allowed to stand in a chamber constantly controlled at 40° C. for 28 days, taken out from the chamber, and then visually checked whether or not there was any abnormality such as aggregation of the polymer and sedimentation of the aggregate. If there was no abnormality, the viscosity thereof was measured in the same manner as that before heating to confirm whether or not increase of viscosity took place.

If the coating composition for thick coating had too high viscosity so that viscosity as it was could not be measured, the coating composition was divided into two portions. One portion was diluted by water so as to obtain viscosity of 40,000±5,000 mPa·s, then amount of the added water and the measured viscosity were recorded. The other portion was poured into a 500-mL plastic vessel till the height of 90%, and then the vessel was tightly sealed by a cap and allowed to stand in a chamber constantly controlled at 40° C. for 28 hours. Thereafter, the vessel was taken out from the chamber and visually checked whether or not there was any abnormality such as aggregation of the polymer and sedimentation of the aggregate. If there was no abnormality, the viscosity thereof was measured by adding the same amount of water as that before the heating to confirm whether or not increase of viscosity took place as compared to that before the heating.

The evaluation criteria thereof were as follows.

"1": There were no abnormalities such as aggregation of the polymer, sedimentation of the aggregates, and viscosity increase.

"2": There were no abnormalities such as aggregation of the polymer or sedimentation of the aggregates, but viscosity was increased (rate of the increase was less than 20% as compared with before the heating).

Rate of viscosity increase (%)=[(viscosity after heating−viscosity before heating)/viscosity before heating]×100

(4) Application Workability With Roller

A 5 mm thickness flexible plate according to JIS A 5430 was cut to prepare a plate having a length of 400 mm and a width of 200 mm. The plate was then applied with a solvent-based fluorinated top coat "ARONWALL FLUORINE-FC (DX) COLOR" (trade name) manufactured by TOAGOSEI Co., Ltd. in place of the aqueous primer and the aqueous acryl silicone-based top coat used in the above-mentioned (2) and was allowed to stand in the same manner as that in the above-mentioned (2) to form a underlying bed. Subsequently, the flexible plate having the underlying bed was erected vertically and applied on the underlying bed, by using an application roller "U ROLLER B" manufactured by OHTSUKA BRUSH MFG., Co., LTD., having a width of 7 inch with a coating composition for thick coating whose viscosity was controlled to 25,000 mPa·s (25° C.) Application workability at this time was evaluated.

In the case where the viscosity of the coating composition for thick coating measured in the same manner as that in the above-mentioned (3) is more than 25,000 mPa·s, water was added thereto until application with a roller became possible, and then application workability was evaluated.

The evaluation criteria thereof were as follows.

"1": Viscosity was not abnormal so that uniform application could be effected on entire area with 0.5 kg/m² or wider.

"2": There were such phenomena that a roller was easy to slide and the coating material was highly viscous, but uniform application could be made on entire area with 0.5 kg/m² or wider.

"3": There were such phenomena that a roller slid, viscosity of the coating material was high, and extendability was poor; and thus, uniform application could not be made on entire area with 0.5 kg/m² or wider.

(5) Dripping Resistance

The flexible plate having the underlying bed for test used in evaluation of application workability with a roller, described in the above-mentioned (4), was erected and then applied thereon with the coating composition for thick coating so as to form a film having a thickness of 150 μm. After that, visual observation was made on whether or not dripping of the coating material occurred when the plate was allowed to stand until the film was formed.

The evaluation criteria thereof were as follows.

"1": No dripping occurred.

"2": A little of dripping occurred.

"3": Much of dripping occurred.

(6) Test of Cracking Resistance at Initial Drying

A 4-mm thickness flexible plate according to JIS A 6916 and stipulated in JIS A 5430 was cut to prepare a piece having a length of 300 mm and a width of 150 mm. The piece was then applied with an aqueous primer and a solvent-based fluorinated top coat sequentially in the same manner as that in the above-mentioned (5), and was allowed to stand to form an underlying bed for test. Subsequently, the flexible plate having the underlying bed for test was erected vertically and applied on the underlying bed with the coating composition for thick coating whose viscosity was controlled at 25,000 mPa·s (25° C.), using the same roller as that in the above-mentioned (5) at an application amount of 1.0 kg/m². Immediately after the application, the plate was allowed to erect in a wind tunnel controlled at a temperature of 20° C.±2° C., a humidity of 65%±10% (RH), and a wind rate of 3±0.3 m/second. After 6 hours, the test plate was taken out and visual observation was made on whether or not cracks were formed on the surface thereof.

The evaluation criteria thereof were as follows.

"1": A crack was not observed.

"2": A shallow line was observed along the roller line on mountain skirts of the roller line.

"3": A crack was observed.

Evaluation results of Examples 1 to 12 are shown in Tables 3 and 4. and evaluation results of Comparative Examples 1 to 7 are shown in Tables 5 and 6.

TABLE 3

| | Solid content (wt %) | Gravity | Example 1 (Production Example 1) | Example 2 (Production Example 2) | Example 3 (Production Example 3) | Example 4 (Production Example 4) | Example 5 (Production Example 1) | Example 6 (Production Example 1) |
|---|---|---|---|---|---|---|---|---|
| Amount of emulsion | 55 | 1 | 100 | 100 | 100 | 100 | 100 | 100 |
| Calcium carbonate powder | 100 | 2.7 | 60 | 60 | 60 | 60 | 15 | 30 |
| Dispersant | 20 | 1 | 5 | 5 | 5 | 5 | 1 | 3 |
| Anti-foaming agent | 100 | 1 | 1.2 | 1.2 | 1.2 | 1.2 | 1.2 | 1.2 |
| Viscosity controller | 5 | 1 | 1 | 1 | 1 | 1 | 3 | 2 |
| Normal portland cement | 100 | 3.1 | — | — | — | — | — | — |
| Aggregate (parts by weight based on 100 parts by weight 100 parts by weight of solid content in emulsion) | | | 109.1 | 109.1 | 109.1 | 109.1 | 27.3 | 54.5 |
| PVC (%) | | | 28.0 | 28.0 | 28.0 | 28.0 | 8.9 | 16.3 |
| Elongation (%) | | | 700 | 750 | 540 | 230 | 980 | 850 |
| Tensile strength (N/mm²) | | | 1.4 | 1.2 | 1.7 | 1.9 | 0.8 | 1.0 |
| Adhesiveness (immersion for 7 days) | Appearance | | 1 | 1 | 1 | 1 | 1 | 1 |
| | Peeling resistance | | 1 | 1 | 1 | 1 | 1 | 1 |
| | Cross-cut adhesion test | | 25/25 | 25/25 | 25/25 | 25/25 | 25/25 | 25/25 |
| Adhesiveness (temperature cycle test) | Appearance | | 1 | 1 | 1 | 1 | 1 | 1 |
| | Peeling resistance | | 1 | 1 | 1 | 1 | 1 | 1 |
| | Cross-cut adhesion test | | 25/25 | 25/25 | 25/25 | 25/25 | 25/25 | 25/25 |
| Storage stability | | | 1 | 1 | 1 | 1 | 1 | 1 |
| Application workability with roller | | | 1 | 1 | 1 | 1 | 1 | 1 |
| Dripping | | | 1 | 1 | 1 | 1 | 1 | 1 |
| Crack in initial drying stage | | | 1 | 1 | 1 | 1 | 2 | 1 |

TABLE 4

| | Solid content (wt %) | Gravity | Example 7 (Production Example 1) | Example 8 (Production Example 1) | Example 9 (Production Example 5) | Example 10 (Production Example 6) | Example 11 (Production Example 7) | Example 12 (Production Example 8) |
|---|---|---|---|---|---|---|---|---|
| Amount of emulsion | 55 | 1 | 100 | 100 | 100 | 100 | 100 | 100 |
| Calcium carbonate powder | 100 | 2.7 | 120 | 200 | 200 | 60 | 60 | 60 |
| Dispersant | 20 | 1 | 8 | 18 | 18 | 5 | 5 | 5 |
| Anti-foaming agent | 100 | 1 | 1.8 | 2.2 | 2.2 | 1.2 | 1.2 | 1.2 |
| Viscosity controller | 5 | 1 | 0.7 | 0.4 | 0.4 | 1 | 1 | 1 |
| Normal portland cement | 100 | 3.1 | — | — | — | — | 10 | — |
| Aggregate (parts by weight based on 100 parts by weight 100 parts by weight of solid content in emulsion) | | | 218.2 | 363.6 | 363.6 | 109.1 | 109.1 | 109.1 |
| PVC (%) | | | 43.2 | 54.9 | 54.9 | 28.0 | 28.0 | 28.0 |

TABLE 4-continued

|  | Solid content (wt %) | Gravity | Example 7 (Production Example 1) | 8 (Production Example 1) | 9 (Production Example 5) | 10 (Production Example 6) | 11 (Production Example 7) | 12 (Production Example 8) |
|---|---|---|---|---|---|---|---|---|
| Elongation (%) |  |  | 350 | 120 | 70 | 70 | 440 | 1220 |
| Tensile strength (N/mm$^2$) |  |  | 1.6 | 2.1 | 2.8 | 2.1 | 1.7 | 0.6 |
| Adhesiveness (immersion for 7 days) | Appearance |  | 1 | 1 | 1 | 1 | 1 | 2 |
|  | Peeling resistance |  | 1 | 1 | 1 | 1 | 1 | 1 |
|  | Cross-cut adhesion test |  | 25/25 | 25/25 | 25/25 | 25/25 | 25/25 | 25/25 |
| Adhesiveness (temperature cycle test) | Appearance |  | 1 | 1 | 1 | 2 | 1 | 2 |
|  | Peeling resistance |  | 1 | 1 | 1 | 1 | 1 | 1 |
|  | Cross-cut adhesion test |  | 25/25 | 25/25 | 25/25 | 25/25 | 25/25 | 25/25 |
| Storage stability |  |  | 1 | 1 | 1 | 1 | 2 | 1 |
| Application workability with roller |  |  | 1 | 2 | 1 | 1 | 1 | 1 |
| Dripping |  |  | 1 | 2 | 1 | 1 | 1 | 1 |
| Crack in initial drying stage |  |  | 1 | 1 | 1 | 2 | 1 | 1 |

TABLE 5

|  | Solid content (wt %) | Gravity | Comparative Example 1 (Comparative Production Example 1) | 2 (Comparative Production Example 3) | 3 (Comparative Production Example 4) | 4 (Comparative Production Example 5) |
|---|---|---|---|---|---|---|
| Amount of emulsion | 55 | 1 | 100 | 100 | 100 | 100 |
| Calcium carbonate powder | 100 | 2.7 | 60 | 60 | 60 | 30 |
| Dispersant | 20 | 1 | 5 | 5 | 5 | 3 |
| Anti-foaming agent | 100 | 1 | 1.2 | 1.2 | 1.2 | 1.2 |
| Viscosity controller | 5 | 1 | 1 | 1 | 1 | 2 |
| Normal portland cement | 100 | 3.1 | — | — | — | — |
| Aggregate (parts by weight based on 100 parts by weight 100 parts by weight of solid content in emulsion) |  |  | 109.1 | 109.1 | 109.1 | 54.5 |
| PVC (%) |  |  | 28.0 | 28.0 | 28.0 | 16.3 |
| Elongation (%) |  |  | 1010 | 950 | 120 | 1450 |
| Tensile strength (N/mm$^2$) |  |  | 0.9 | 0.3 | 2.6 | 0.3 |
| Adhesiveness (immersion for 7 days) | Appearance |  | 3(blister) | 3(blister) | 1 | 3(blister) |
|  | Peeling resistance |  | 2 | 1 | 2 | 1 |
|  | Cross-cut adhesion test |  | 0/25 | 0/25 | 0/25 | 25/25 |
| Adhesiveness (temperature cycle test) | Appearance |  | 3(blister) | 1 | 1 | 3(blister) |
|  | Peeling resistance |  | 2 | 2 | 2 | 1 |
|  | Cross-cut adhesion test |  | 0/25 | 15/25 | 0/25 | 25/25 |
| Storage stability |  |  | 1 | 1 | 1 | 2 |
| Application workability with roller |  |  | 1 | 1 | 1 | 1 |
| Dripping |  |  | 1 | 1 | 1 | 1 |
| Crack in initial drying stage |  |  | 1 | 1 | 1 | 1 |

TABLE 6

|  | Solid content (wt %) | Gravity | Comparative Example 5-1 (Production Example 1) | 5-2 (Production Example 1) | 6 (Comparative Production Example 6) | 7 (Comparative Production Example 7) |
|---|---|---|---|---|---|---|
| Amount of emulsion | 55 | 1 | 100 | 100 | 100 | 100 |
| Calcium carbonate powder | 100 | 2.7 | — | — | 60 | 50 |
| Dispersant | 20 | 1 | — | — | 5 | 5 |
| Anti-foaming agent | 100 | 1 | 1.2 | 1.2 | 1.2 | 1.2 |
| Viscosity controller | 5 | 1 | 8 | 12 | 1 | 1 |
| Normal portland cement | 100 | 3.1 | — | — | — | 10 |
| Aggregate (parts by weight based on 100 parts by weight 100 parts by weight of solid content in emulsion) |  |  | — | — | 109.1 | 109.4 |
| PVC (%) |  |  | — | — | 28.0 | 28.7 |
| Elongation (%) |  |  | 1120 | 1120 | 900 | 400 |
| Tensile strength (N/mm$^2$) |  |  | 0.7 | 0.7 | 0.1 | 2.0 |
| Adhesiveness (immersion for 7 days) | Appearance |  | 1 | 1 | 3(blister) | 3(blister) |
|  | Peeling resistance |  | 1 | 1 | 2 | 2 |
|  | Cross-cut adhesion test |  | 25/25 | 25/25 | 0/25 | 0/25 |

TABLE 6-continued

|  |  | Solid content (wt %) | Gravity | Comparative Example | | | |
|---|---|---|---|---|---|---|---|
|  |  |  |  | 5-1 (Production Example 1) | 5-2 (Production Example 1) | 6 (Comparative Production Example 6) | 7 (Comparative Production Example 7) |
| Adhesiveness (temperature cycle test) | Appearance |  |  | 1 | 1 | 3(blister) | 3(blister) |
|  | Peeling resistance |  |  | 1 | 1 | 2 | 2 |
|  | Cross-cut adhesion test |  |  | 25/25 | 25/25 | 0/25 | 0/25 |
| Storage stability |  |  |  | 1 | 1 | 1 | 2 |
| Application workability with roller |  |  |  | 3 | 1 | 1 | 1 |
| Dripping |  |  |  | 3 | 1 | 1 | 1 |
| Crack in initial drying stage |  |  |  | — | 3 | 1 | 1 |

"PVC" in Tables 3 to 6 means pigment volume concentration.

[4] Effect of Examples

According to Tables 3 and 4. it is clear in Examples 1 to 4, 6, and 7 that since the emulsion composition whose monomer composition was within the scope of the present invention and PVC was within the preferable range, the coating compositions for thick coating showed excellent properties, namely, elongation was between 230% and 850% and tensile strength was between 1.0 and 1.9 N/mm$^2$ (these values were within the preferable range); adhesiveness, storage stability, and application workability by a roller were excellent; and there were no cracks formed at initial drying.

On the other hand, according to results in Tables 5 and 6. it is clear from Comparative Example 1 in which the emulsion composition by Comparative Preparation Example 1 without using 2-hydroxy-3-phenoxypropyl acrylate was used, that swollenness was observed by any of the water-immersion treatment for 7 days and the temperature cycle treatment, and that adhesiveness was insufficient because of poor results in peel resistance and in the cross-cut adhesion test. Additionally, it is clear from Comparative Example 2 in which the emulsion composition by Comparative Preparation Example 3 without using acrylonitrile was used, that the tensile strength was small at 0.3 N/mm$^2$, and that adhesiveness was insufficient because, in adhesion test, swollenness was observed by the water-immersion treatment for 7 days and peel resistance was poor in the temperature cycle treatment.

Moreover, it is clear from Comparative Example 3 in which the emulsion composition by Comparative Preparation Example 4 using excessive amount of acrylonitrile was used, that adhesiveness was insufficient because of poor peel resistance and the like, though the coated film was tough. In addition, it is clear from Comparative Example 4 in which the emulsion composition by Comparative Preparation Example 5 without using acrylic acid was used, that the tensile strength was small at 0.3 N/mm$^2$, that adhesiveness was insufficient because swollenness was observed by any of the water-immersion treatment for 7 days and in the temperature cycle treatment, and that the storage stability was poor because viscosity was increased during storage. Furthermore, it is clear from Comparative Example 5 in which aggregate was not blended though the emulsion composition by Preparation Example 1 was used, that, when 8 parts of the viscosity modifier (thickener) was used (Comparative Example 5-1), dripping of the coating occurred and a roller tended to slide easily because a roller did not adhere (was not gripped) to the underlying bed during application by a roller; on the other hand, when the viscosity modifier was increased to 12 parts (Comparative Example 5-2), it is clear that application was easy and dripping of the coating did not occur, but cracks were formed at initial drying.

Clearly from results in Tables 3 and 4. shallow cracks were formed at initial drying in Example 5 in which PVC was low at 8.9%. In Example 8 in which PVC was high at 54.9%, application was not easy because the coating was dripped a little and viscosity during application by a roller was high. Additionally, in Example 9 in which the emulsion composition by Preparation Example 5 using monomers giving Tg of −5.2° C. was used and PVC was as high as that in Example 8 (54.9%), application was easy because viscosity of the coating material during application by a roller was low. Moreover, in Example 10 in which the emulsion composition by Preparation Example 6 using monomers giving Tg of 6.0° C. was used, the appearance was inferior because fine cracks were formed in the dried film obtained after the temperature cycle treatment, and shallow cracks were observed at initial drying.

On the other hand, clearly from results in Table 6. the tensile strength was small at 0.1 N/mm$^2$ and adhesiveness was insufficient because swollenness was observed by any of the water-immersion treatment for 7 days and the temperature cycle treatment in Comparative Example 6 in which the emulsion composition by Comparative Preparation Example 7 using monomers giving Tg of −60° C. without 2-hydroxy-3-phenoxyporpyl acrylate was used. Additionally, in Comparative Example 7 in which the emulsion composition by Comparative Preparation Example 7 was used and ordinary portland cement was blended in the coating composition for thick coating, the coated film was tough because the tensile strength was 2.0 N/mm$^2$, but adhesiveness was as poor as the above-mentioned; and moreover, the stability was low because viscosity was increased during storage.

Further, clearly from results in Table 4. both tensile properties and adhesiveness were excellent, but viscosity was prone to be somewhat increased during storage in Example 11 in which the emulsion composition by Preparation Example 7 using monomers giving Tg of −71.5° C. was used and ordinary portland cement was blended in the coating composition for thick coating. Furthermore, in Example 12 in which the emulsion composition by Preparation Example of 8 adjusting monomers was used thereby giving the coated film having tensile strength of 0.6 N/mm$^2$ and elongation of 1,220%, adhesiveness was prone to be slightly decreased and a little swollenness was observed in the dried film by any of the water-immersion treatment for 7 days and the temperature cycle treatment.

INDUSTRIAL APPLICABILITY

The present invention can be used for waterproof and framework protection at vertical surface of a wall, a pillar and the like, a horizontal surface of a roof and a floor, for an architectural and civil structure, and at a basement, a water tank and tunnel. The present invention is especially useful in waterproof and framework protection of a wall and the like, since excessively large amount of aggregate is not needed, a coated film does not drip easily even when applied on a slant surface or a vertical surface, and a dried film having physical properties such as flexibility and adhesiveness can be obtained.

What is claimed is:

1. A coating composition, comprising:
   an aggregate and
   an emulsion composition comprising a polymer particle dispersed in an aqueous medium,
   wherein the polymer particle comprises:
   (A) 40% to 95% by mass of a structural unit formed by polymerizing an alkyl (meth)acrylate monomer having an alkyl group with 4 to 14 carbon atoms,
   (B) 0.1% to 5% by mass of a structural unit formed by polymerizing an ethylenically unsaturated carboxylic acid monomer,
   (C) 1% to 20% by mass of a structural unit formed by polymerizing a vinyl monomer having a cyano group,
   (D) 1% to 20% by mass of a structural unit formed by polymerizing a monomer which is a reaction product of a (meth)acrylic acid and a monofunctional epoxy compound, and
   (E) 0% to 50% by mass of a structural unit formed by polymerizing another monomer which is capable of copolymerizing with at least one compound among said monomers,
   based on 100% by mass of a total of said structural unit (A), said structural unit (B), said structural unit (C), said structural unit (D), and said structural unit (E);
   wherein the monomer that is polymerized to form the structural unit (D) is at least one compound selected from the group consisting of 2-hydroxy-3-phenoxypropyl acrylate and 2-hydroxy-3-p-methylphenoxypropyl acrylate;
   wherein the other monomer that is polymerized to form the structural unit (E) is at least one compound selected from the group consisting of an alkyl (meth)acrylate monomer having an alkyl group with 1 to 3 carbon atoms, a vinyl monomer having a hydroxyl group, a vinyl monomer having an amino group, a vinyl monomer having an amide group, a vinyl monomer having an alkoxyl group, an aromatic vinyl monomer, a conjugated diene monomer, a maleimide monomer, a vinylester monomer, a vinylether monomer, a vinyl monomer having a glycidyl group, an unsaturated dicarboxylic acid monoalkyl ester, an unsaturated dicarboxylic acid dialkyl ester, and a monomer having a silicon-containing group; and
   wherein the coating composition is suitable for thick coating.

2. The coating composition of claim 1,
   wherein a pigment volume concentration of said aggregate is from 5% to 60%.

3. The coating composition of claim 1,
   wherein the coating composition forms a dried film having tensile strength from 0.5 to 3.0 N/mm$^2$, and
   an elongation of the dried film is from 50% to 2,000%.

4. The coating composition of claim 2,
   wherein the coating composition forms a dried film having a tensile strength of from 0.5 to 3.0 N/mm$^2$, and
   an elongation of the dried film is from 50% to 2,000%.

5. The coating composition of claim 1, further comprising at least one additive selected from the group consisting of a dispersant, an anti-foaming agent, a viscosity modifier, a thickener, a leveling agent, an anti-dripping agent, a pigment, a pH-controlling agent, a crosslinking agent, a plasticizer, a stabilizer, an antiseptic agent, a mildew-proof agent, an anti-freezing agent, a coating adjuvant, a solvent, an antibacterial agent, and an antioxidant.

6. The coating composition of claim 1,
   wherein the coating composition forms a dried film having a thickness of from 100 to 5000 μm.

7. The coating composition of claim 1,
   wherein the emulsion composition further comprises a plurality of the polymer particles and
   an average particle size of the plurality of polymer particles is 5 μm or less.

8. The coating composition of claim 7,
   wherein the average particle size of the plurality of polymer particles is from 0.01 to 5 μm.

9. The coating composition of claim 1, wherein the alkyl (meth)acrylate monomer having an alkyl group with 4 to 14 carbon atoms is n-butyl (meth)acrylate, isobutyl (meth)acrylate, sec-butyl (meth)acrylate, tert-butyl (meth)acrylate, n-pentyl (meth)acrylate, isoamyl (meth)acrylate, n-hexyl (meth)acrylate, 2-methylpentyl (meth)acrylate, n-octyl (meth)acrylate, 2-ethylhexyl (meth)acrylate, n-octyl (meth) acrylate, isooctyl (meth)acrylate, n-nonyl (meth)acrylate, isononyl (meth)acrylate, 2-methyloctyl (meth)acrylate, 2-ethylhexyl (meth)acrylate, decyl (meth)acrylate, dodecyl (meth)acrylate, tridecyl (meth)acrylate, lauryl (meth)acrylate, cyclohexyl (meth)acrylate, or isobornyl (meth)acrylate.

10. The coating composition of claim 1, wherein the ethylenically unsaturated carboxylic acid monomer is an unsaturated monobasic acid, an unsaturated dibasic acid, or an unsaturated anhydride.

11. The coating composition of claim 1, wherein the vinyl monomer having a cyano group is acrylonitrile, methacrylonitrile, α-ethylacrylonitrile, α-isopropylacrylonitrile, α-chloroacrylonitrile, or α-fluoroacrylonitrile.

12. The coating composition of claim 1, wherein the monomer which is a reaction product of a (meth)acrylic acid and a monofunctional epoxy compound is a compound having a (meth)acryloyl group.

13. The coating composition of claim 1, wherein the aggregate comprises calcium carbonate, barium sulfate, silicon oxide, titanium oxide, talc, mica, kaolin, clay, ferrite, quartz sand, or a combination thereof.

14. A coating composition, comprising:
    an aggregate and
    an emulsion composition comprising a polymer particle dispersed in an aqueous medium,
    wherein the polymer particle comprises:
    (A) 40% to 95% by mass of a structural unit formed by polymerizing an alkyl (meth)acrylate monomer having an alkyl group with 4 to 14 carbon atoms,
    (B) 0.1% to 5% by mass of a structural unit formed by polymerizing an ethylenically unsaturated carboxylic acid monomer,
    (C) 1% to 20% by mass of a structural unit formed by polymerizing a vinyl monomer having a cyano group,
    (D) 1% to 20% by mass of a structural unit formed by polymerizing a monomer which is a reaction product of a (meth)acrylic acid and a monofunctional epoxy compound, and
    (E) 0% to 50% by mass of a structural unit formed by polymerizing another monomer which is capable of copolymerizing with at least one compound among said monomers, based on 100% by mass of a total of said structural unit (A), said structural unit (B), said structural unit (C), said structural unit (D), and said structural unit (E);

wherein the coating composition is suitable for thick coating; and wherein the aggregate is an organic or an inorganic hollow balloon.

15. The coating composition of claim 1, wherein an average particle size of particles of the aggregate is from 0.01 to 1,000 μm.

* * * * *